United States Patent
Zhang

(10) Patent No.: US 9,943,069 B2
(45) Date of Patent: Apr. 17, 2018

(54) PET CAT TOY

(71) Applicant: TONGFU MANUFACTURING CO., LTD., Nanjing, Jiangsu Province (CN)

(72) Inventor: Wen Zhang, Nanjing (CN)

(73) Assignee: TONGFU MANUFACTURING CO., LTD., Nanjing (CN)

( * ) Notice: Subject to any disclaimer, the term of this patent is extended or adjusted under 35 U.S.C. 154(b) by 119 days.

(21) Appl. No.: 15/187,091

(22) Filed: Jun. 20, 2016

(65) Prior Publication Data

US 2017/0251636 A1   Sep. 7, 2017

(30) Foreign Application Priority Data

Apr. 21, 2015 (CN) .................... 2015 2 0242626 U

(51) Int. Cl.
| | | |
|---|---|---|
| A01K 15/00 | (2006.01) | |
| A63H 3/02 | (2006.01) | |
| A01K 15/02 | (2006.01) | |

(52) U.S. Cl.
CPC .......... *A01K 15/025* (2013.01); *A01K 15/026* (2013.01); *A63H 3/02* (2013.01)

(58) Field of Classification Search
CPC .......... A63H 3/02; A63H 3/003; A63H 3/005; A63H 3/008; A01K 15/025; A01K 15/02; A01K 15/026; Y10S 261/88
USPC ........ 119/711, 702, 709, 710, 707; 446/369, 446/73
See application file for complete search history.

(56) References Cited

U.S. PATENT DOCUMENTS

| | | | | |
|---|---|---|---|---|
| 1,007,922 A | * | 11/1911 | Cohen ..................... | A63H 3/003 2/66 |
| 4,197,670 A | * | 4/1980 | Cox ....................... | A63H 3/008 434/273 |
| 4,465,232 A | * | 8/1984 | Field ....................... | A61L 9/12 116/234 |
| 4,694,829 A | * | 9/1987 | Frye ....................... | A61F 7/02 383/901 |
| 4,950,194 A | * | 8/1990 | Gullace ................... | A63H 3/003 428/17 |
| 5,597,339 A | * | 1/1997 | Spector ................... | A63H 3/005 446/226 |
| 5,682,838 A | * | 11/1997 | Reich ...................... | A01K 15/025 119/709 |

(Continued)

*Primary Examiner* — Yvonne R Abbott-Lewis
(74) *Attorney, Agent, or Firm* — Oliff PLC

(57) ABSTRACT

An improved pet cat toy, including main body, where main body is made of textile material and has hollow interior, wall of main body is provided with first opening and second opening on different sides, first opening is provided with first outer interlayer that includes open seal and can open and close first opening, second opening is provided with perspective second outer interlayer, inner interlayer including open seal is disposed between first opening and second opening, interior of main body is divided into first cavity and second cavity, and catnip capable of being replaced is filled in first cavity and second cavity separately. The present utility model is reasonably designed, has simple structure, can expose part of catnip, and enhances attraction to pet cat and master thereof. Besides, internal catnip can be replaced in time and conveniently, enduringly keep the toy attractive, and the toy can be recycled, lowering cost.

6 Claims, 1 Drawing Sheet

(56) References Cited

U.S. PATENT DOCUMENTS

| | | | | |
|---|---|---|---|---|
| 6,048,248 | A * | 4/2000 | Ritchey | A63H 3/003 446/369 |
| 6,089,947 | A * | 7/2000 | Green | A63H 3/003 119/711 |
| 6,350,169 | B1 * | 2/2002 | Holt | A63H 3/005 446/327 |
| 6,663,457 | B2 * | 12/2003 | Ritchey | A01K 15/025 119/702 |
| 6,840,197 | B1 * | 1/2005 | Trompke | A01K 15/02 119/711 |
| 6,918,355 | B1 * | 7/2005 | Arvanites | A01K 15/026 119/707 |
| 7,150,245 | B2 * | 12/2006 | Lamstein | A01K 15/025 119/711 |
| 7,169,008 | B2 * | 1/2007 | Ritchey | A01K 15/025 119/702 |
| 7,887,387 | B2 * | 2/2011 | Colvin | A63H 3/02 446/369 |

* cited by examiner

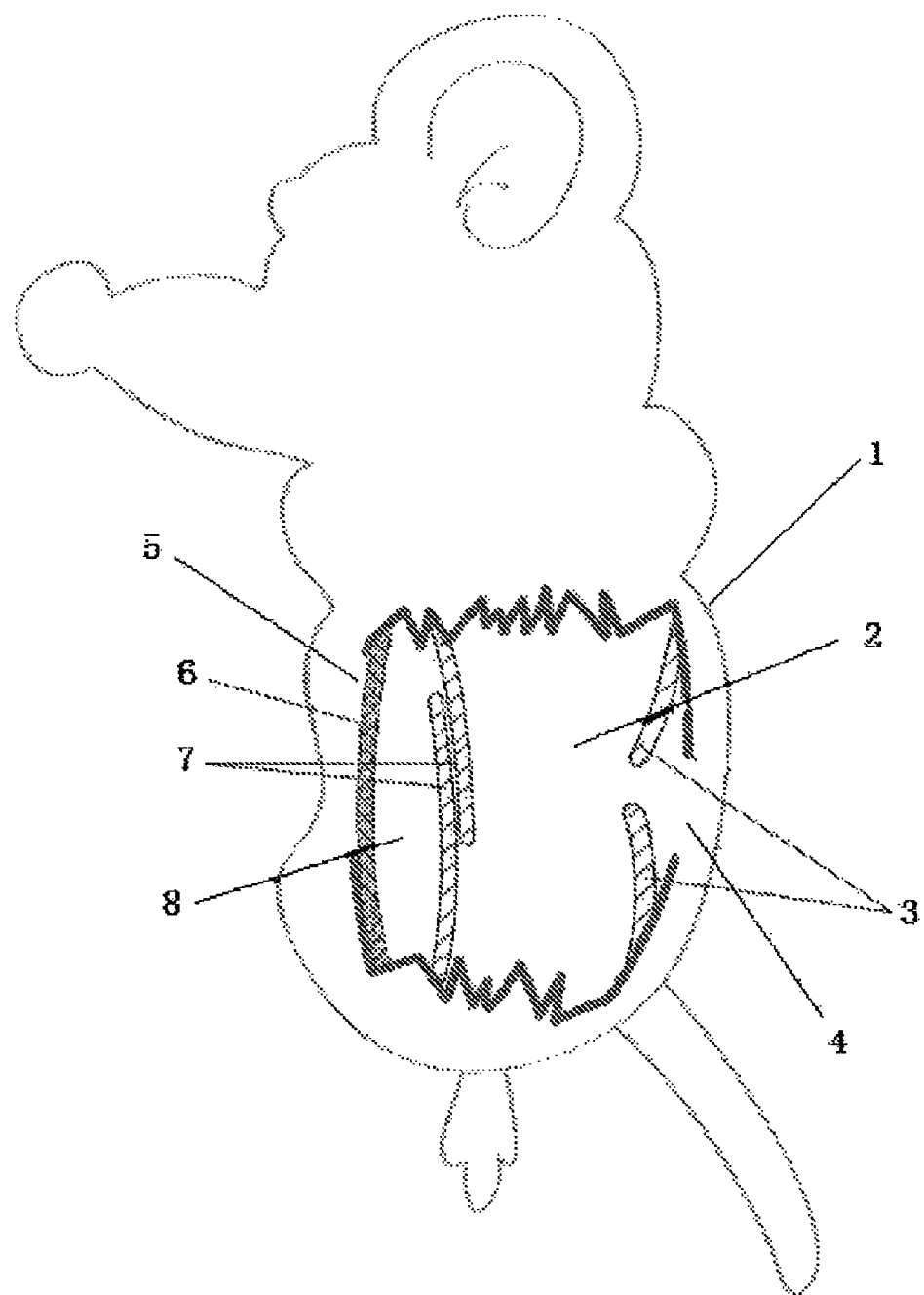

PET CAT TOY

BACKGROUND

Technical Field

The present utility model relates to a toy for pets, and in particular, to a toy for pet cats that has more attraction, which specifically is an improved pet cat toy.

Related Art

In Europe, America, and China, raising of pet cats becomes increasingly popular. However, with development of the society, people start to live in crowd cities in groups, and a space for family life of people is further compressed; correspondingly, pet cats also gradually lose an activity space. Therefore, some pet toys that meet pet's favors and can draw pet's interest appear on the market. Currently, most of pet cat toys usually fill materials such as catnip inside the toys, facilitating scratching and biting of pet cats. However, because catnip is invisible and can hardly draw pet cat's and master's interest, improvement needs to be made.

SUMMARY

An objective of the present utility model is providing an improved pet cat toy specific to deficiency of the prior art, which can strongly and intuitively attract a pet cat and a master thereof, making the toy more entertaining and attractive. Besides, an internal filler can be replaced conveniently, enduringly keeping the toy attractive.

A technical solution of the present utility model is:

An improved pet cat toy includes a main body, where the main body is made of a textile material and has an hollow interior, a wall of the main body is provided with a first opening and a second opening on different sides, the first opening is provided with a first outer interlayer that includes an open seal and that can open and close the first opening, the second opening is provided with a perspective second outer interlayer, an inner interlayer including an open seal is disposed between the first opening and the second opening, the interior of the main body is divided into a first cavity and a second cavity, and catnip capable of being replaced is filled in the first cavity and the second cavity separately.

Further, the first outer interlayer and the inner interlayer are both composed by overlapping several flexible material sheets, and sides of each flexible material sheet except for an overlapping part are all secured to the main body.

Further, the second outer interlayer is made of any material of grenadine, gauze, a water proof paper, a plastic bag, or a soft plastic plate.

Further, the first cavity is connected to the first opening, the second cavity is connected to the second opening, and a volume of the first cavity is greater than that of the second cavity.

Further, the catnip is in bulk or in bags.

Further, a packaging bag of the catnip in bags is made of a perspective material.

Beneficial effects of the present utility model are:

The present utility model is reasonably designed, has a simple structure, can expose a part of catnip, and enhances attraction to a pet cat and a master thereof. Besides, internal catnip can be replaced in time and conveniently, enduringly keep the toy attractive, and the toy can be recycled, lowering a cost.

BRIEF DESCRIPTION OF THE DRAWINGS

FIG. 1 is a schematic structural diagram of the present utility model.

1—a main body; 2—a first cavity; 3—a first outer interlayer; 4—a first opening; 5—a second opening; 6—a second outer interlayer; 7—an inner interlayer; and 8—a second cavity.

DETAILED DESCRIPTION

The present utility model is further described with reference to figures and embodiments in the below.

As shown in FIG. 1,

An improved pet cat toy includes a main body 1. The main body 1 is made of a textile material, such as plush and can be made into animal shapes such as a mouse or other shapes, to draw pet cat's attention. The main body 1 has an hollow interior, and a wall of the main body 1 is provided with a first opening 1 and a second opening 2 on different sides. Preferably, the first opening 4 and the second opening 5 may be disposed on two opposite side walls, facilitating a subsequent filling operation. The first opening 4 is provided with a first outer interlayer 3 that includes an open seal and that can open and close the first opening, facilitating taking out a filler of the main body 1 and putting a filler in the main body 1. The second opening 5 is provided with a second outer interlayer 6 made of a perspective material, facilitating seeing the internal filler from the outside. Preferably, the second outer interlayer 6 is made of any material of grenadine, gauze, a water proof paper, a plastic bag, or a soft plastic plate, not only making it have a perspective effect but also making the pet cat smell odor of the internal filler, enhancing attraction to the pet cat. An inner interlayer 7 including an open seal is disposed between the first opening 4 and the second opening 5, the interior of the main body 1 is divided into a first cavity 2 and a second cavity 8, and catnip capable of being replaced is filled in the first cavity and the second cavity separately, molding the main body 1. The first cavity 2 is connected to the first opening 4, the second cavity 8 is connected to the second opening 5, and a volume of the first cavity 2 is greater than that of the second cavity 8, facilitating filling of the catnip.

The first outer interlayer 3 and the inner interlayer 7 are both composed by overlapping several flexible material sheets. A flexible material may be various textile materials or knitted materials, such as plush, cotton cloths, and chemical fiber fabrics. Preferably, two flexible material sheets may be used to be secured to the main body 1 in a sewing manner and are made to overlap with each other to form an open seal, to seal the first opening or a segment space. In this way, only a tiny force is required to separate the flexible materials, facilitating taking out and putting the filler. Then the flexible material sheets recover to normal and then can block the openings and prevent the filler from falling.

Further, the catnip is in bulk or in bags, which can be selected to use according to needs. A packaging bag of the catnip in bags is made of a perspective material, making the toy be seen by the pet cat and emitting odor of the catnip.

During using, the outer interlayer is first properly separated, and the catnip in bulk or in bags is put from the first opening to the first cavity. Then, the inner interlayer is properly separated, and the catnip put in the previous step is put into the second cavity. When the second cavity is filled in place, the inner interlayer is recovered, and the catnip is filled in the first cavity until the main body is completely filled and molded. The second outer interlayer at the second opening has a perspective effect and can be seen by the pet cat and make the pet cat smell odor of the internal catnip, thereby drawing great pet's attention. When the catnip has a fading color or loses odor, the catnip can be taken out according to a reverse sequence of the foregoing steps and can be replaced, keeping the toy attractive to the pet cat. Therefore, the present utility model not only enhances attraction to a pet cat but also can be recycled, lowering a cost.

Parts not involved in the present utility model are all the same as the prior art or can all be implemented by using the prior art.

What is claimed is:

1. An improved pet cat toy, comprising a main body, wherein the main body is made of a textile material and has an hollow interior, a wall of the main body is provided with a first opening and a second opening on different sides, the first opening is provided with a first outer interlayer that comprises an open seal and that can open and close the first opening, the second opening is provided with a perspective second outer interlayer, an inner interlayer comprising an open seal is disposed between the first opening and the second opening, the interior of the main body is divided into a first cavity and a second cavity, and catnip capable of being replaced is filled in the first cavity and the second cavity separately.

2. The improved pet cat toy according to claim 1, wherein the first outer interlayer and the inner interlayer are both composed by overlapping several flexible material sheets, and sides of each flexible material sheet except for an overlapping part are all secured to the main body.

3. The improved pet cat toy according to claim 1, wherein the second outer interlayer is made of any material of grenadine, gauze, a water proof paper, a plastic bag, or a soft plastic plate.

4. The improved pet cat toy according to claim 1, wherein the first cavity is connected to the first opening, the second cavity is connected to the second opening, and a volume of the first cavity is greater than that of the second cavity.

5. The improved pet cat toy according to claim 1, wherein the catnip is in bulk or in bags.

6. The improved pet cat toy according to claim 5, wherein a packaging bag of the catnip in bags is made of a perspective material.

* * * * *